United States Patent
Murayama et al.

(10) Patent No.: US 6,264,451 B1
(45) Date of Patent: Jul. 24, 2001

(54) PUMP EQUIPMENT WITH PLURAL ROTARY PUMPS AND METHOD FOR ASSEMBLING SAME

(75) Inventors: Takashi Murayama; Takeshi Fuchida; Daizo Oba, all of Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/295,312

(22) Filed: Apr. 21, 1999

(30) Foreign Application Priority Data

Apr. 22, 1998 (JP) .................................................. 10-112436

(51) Int. Cl.[7] ................................. F04C 2/10; F04C 11/00
(52) U.S. Cl. ........................... 418/171; 418/200; 418/210
(58) Field of Search ................................ 418/9, 166, 171, 418/200, 210, 212

(56) References Cited

U.S. PATENT DOCUMENTS 3,551,081 * 12/1970 Brundage .............................. 418/210
4,116,588 * 9/1978 Phillips et al. ............................ 418/9

FOREIGN PATENT DOCUMENTS

608316 * 9/1960 (IT) ..................................... 418/200
60-38186 3/1985 (JP) .
9-126157 5/1997 (JP) .

* cited by examiner

Primary Examiner—John J. Vrablik
(74) Attorney, Agent, or Firm—Pillsbury Winthrop LLP

(57) ABSTRACT

In a pump equipment having plural rotary pumps, the respective discharge ports of the rotary pumps are located at the points which are nearly symmetrical with respect to the center axis of the drive shaft to counterbalance each other the respective reaction forces against the drive shaft to be produced by the high pressure at the respective discharge ports. The respective discharge fluid conduits, in case of the first and second pumps, are located at the points which are opposite each other, more preferably, different at an angle of 180 degrees each other, with respect to the center axis of the drive shaft to limit the bending of the drive shaft. As a method for assembling the pump equipment, the peripheral border between respective cylindrical members piled up for constituting the casing is tentatively welded by laser beam at first and, then, all around the peripheral borders are finally welded.

8 Claims, 6 Drawing Sheets

PUMP EQUIPMENT WITH PLURAL ROTARY PUMPS AND METHOD FOR ASSEMBLING SAME

CROSS REFERENCE TO RELATED APPLICATION

This application is based upon and claims the benefit of priority of Japanese Patent Application No. H.10-112436 filed on Apr. 22,1998, the contents of which are incorporated herein by reference.

BACKGROUND OF THE INVENTION

1. Field of the Invention:

The present invention relates to a pump equipment having plural rotary pumps and a method for assembling the pump equipment. In particular, the present invention is preferably applied to an internal gear pump such as a trochoid pump or the like for brake apparatus for vehicles.

2. Description of Related Art:

A rotary pump, for example, an internal gear pump, is comprised of a drive shaft to be driven by a motor, an inner rotor and an outer rotor to be rotated by the drive shaft and a casing for containing the drive shaft and the inner and outer rotors. The casing is provided with a pump room in which the inner and outer rotors are contained, an intake port and a discharge port for sucking and discharging oil and a shaft hole communicating to the pump room from the motor side. The drive shaft is fitted into the inner rotor through the shaft hole.

As an example of the pump in which two rotary pumps are rotated by a drive shaft, a tandem pump equipment is described in JP-A-H.9-126157. In the tandem pump equipment, the discharge ports of the two rotary pumps are provided, respectively, in the same direction from the drive shaft and the intake ports, respectively, in the same direction from the drive shaft, but in the opposite direction from the respective discharge ports. Each pressure at the respective discharge ports of the two rotary pumps is reacted in the same direction against the drive shaft and the drive shaft receives an unbalance force so that the pump operation may be adversely affected due to the bending of the shaft.

SUMMARY OF THE INVENTION

An object of the present invention is to provide a pump equipment having a plural of rotary pumps capable of smoothly rotating the pumps because of a limited bending of their drive shafts. The pump equipment has a construction that the respective discharge ports of the rotary pumps are located at the points which are nearly symmetrical with respect to the center axis of the drive shaft. The respective reaction forces against the drive shaft to be produced by the high pressure at the respective discharge ports may be counterbalanced each other so that the possible bending of the drive shaft may be limited.

As an another aspect of the present invention for limiting the bending of the drive shaft for the pump equipment having two rotary pumps, the intake and discharge fluid conduits of one pump and the intake and discharge fluid conduits of the other pump are arranged at the locations which are, not between the pumps, but outside from the pumps, respectively. Preferably, these locations of the intake and discharge fluid conduits will serve to narrow the space between the two pumps so that the pump equipment may become compact.

As a further aspect of the present invention, two bearings for holding the drive shaft are arranged outside the two pumps, that is, at the respective positions between which the two pumps are inserted. The forces due to the high pressure at the discharge ports are reacted against the drive shaft inside the two bearings. Therefor, the bending of the drive shaft is more limited, compared with a case that the forces are reacted against the drive shaft outside the two bearings.

Furthermore, it is one of the objects to provide a method for assembling the pump equipment in such a way that a part of the peripheral border between respective cylindrical members piled up for constituting the casing is tentatively welded by laser beam at first and, then, all around the peripheral borders are finally welded. Such a method is effective for limiting a deformation or a position shift of the respective members, because the energy of the tentative spot welding by laser beam is less than that of the final welding and, therefor, the deformation force by laser beam is not so strongly influenced.

It is preferable to apply to the welding portions the laser beams from plural side positions at the same time so as to counterbalance each other the respective forces given by laser beams to the welding portions. This method may be used in the above tentative spot welding. Furthermore, such a method makes it possible to weld all around the peripheral borders without causing the deformation or the position shift of the respective cylindrical members, even if the tentative spot welding is eliminated and the relatively large energy of laser beams is applied at the same time to the welding portions.

It is a final object of the present invention to provide a brake apparatus having a hydraulic circuit in which the pump equipment described above is applied. The pump equipment is used for increasing fluid pressure to wheel cylinders in the hydraulic circuit. In particular, each of plural rotary pumps is operative in each of fluid conduits separately provided in the hydraulic circuit.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
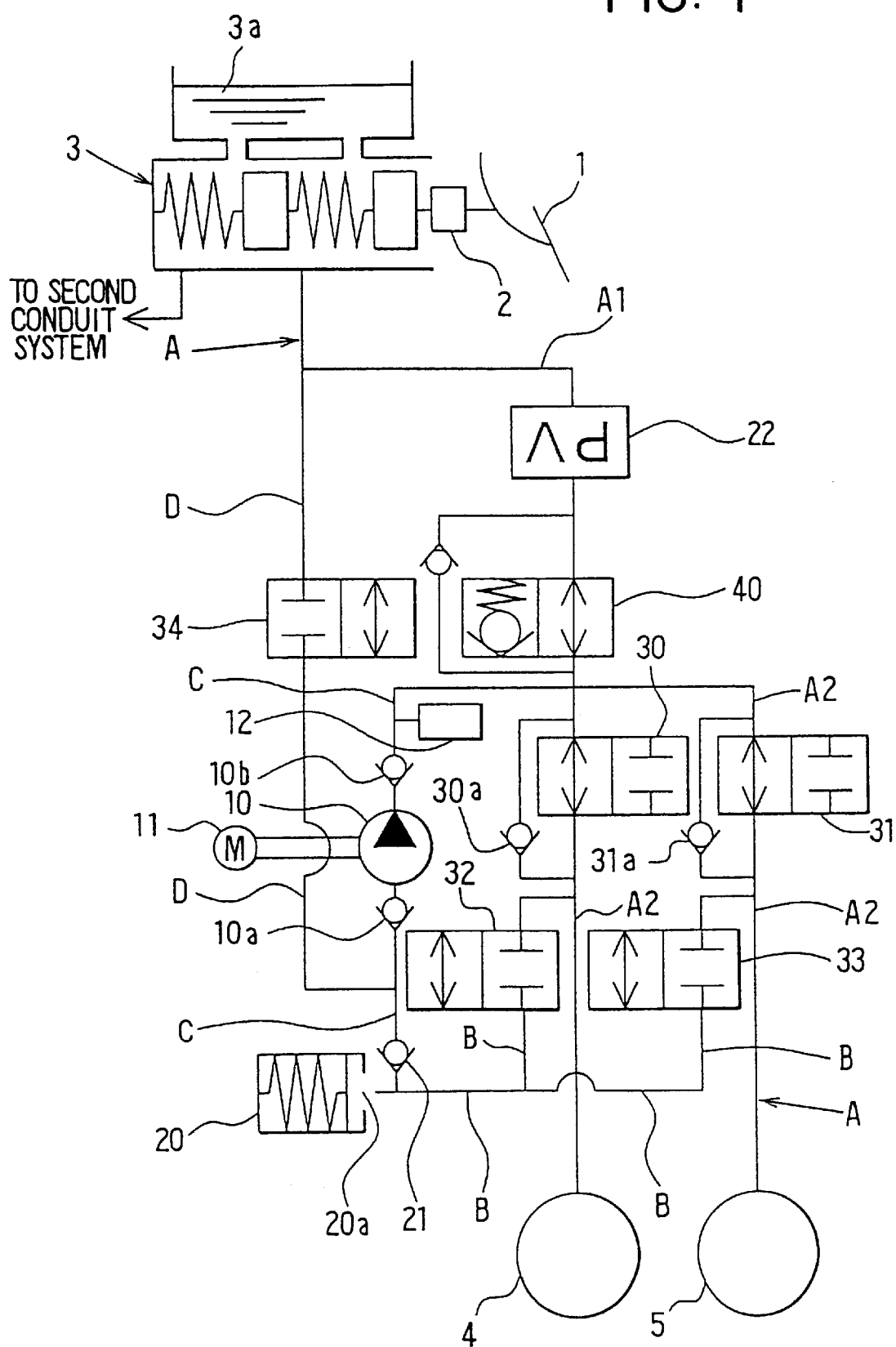
FIG. 1 is an outline structure of a brake apparatus.

FIG. 1 shows an outline structure of a brake apparatus to which a trochoid pump is applied as a rotary pump. The basic constitution of the brake apparatus will be described with reference to FIG. 1. In this embodiment, a brake apparatus is applied to a vehicle provided with a hydraulic circuit of a diagonal conduit system having a first conduit connecting wheel cylinders of a front right wheel and a rear left wheel and a second conduit connecting wheel cylinders of a front left wheel and a rear right wheel. The vehicle is a four wheel vehicle of front wheel drive.

As shown in FIG. 1, a brake pedal 1 is connected to a booster 2. Brake depression force (brake pedal stroke) is boosted by the booster 2.

Further, the booster 2 is provided with a rod for transmitting boosted depression force to a master cylinder 3. In detail, the master cylinder 3 generates master cylinder pressure when the rod pushes a master piston arranged in the master cylinder 3. The brake pedal 1, the booster 2 and the master cylinder 3 correspond to a brake fluid pressure generating device.

The master cylinder 3 is provided with a master reservoir 3a for supplying brake fluid into the master cylinder 3 or storing extra brake fluid of the master cylinder 3.

Further, the master cylinder pressure is transmitted to a wheel cylinder 4 for a front right wheel (FR) and a wheel cylinder 5 for a rear left wheel (RL) via a brake assist system provided with a function of an antilock brake system (hereinafter, referred to as ABS). In the following explanation, the brake apparatus will be described with respect to the hydraulic circuit in the first conduit connecting the wheel cylinders of a front right wheel (FR) and a rear left wheel (RL). The explanation for the second conduit connecting the wheel cylinders of a front left wheel (FL) and a rear right wheel (RR) will be omitted since the hydraulic circuit in the second conduit is quite similar to that in the first conduit.

The brake apparatus is provided with a conduit (main conduit) A connected to the master cylinder 3. A proportioning valve (PV) 22 is disposed in the main conduit A. The main conduit A is divided into two portions by the proportioning valve 22. That is, the main conduit A is divided into a first conduit A1 from the master cylinder 3 to the proportioning valve 22 and a second conduit A2 from the proportioning valve 22 to the respective wheel cylinders 4 and 5.

The proportioning valve 22 has a function of transmitting a reference pressure of a brake fluid to the downstream side with a predetermined attenuation rate when the braking fluid flows in the positive direction (in this embodiment, a direction from the side of the wheel cylinder to the side of the master cylinder is the positive direction). That is, by inversely connecting the proportioning valve 22 as shown in FIG. 1, pressure of the brake fluid on the side of the second conduit A2 becomes the reference pressure.

Further, the second conduit A2 branches out two conduits. A pressure increasing control valve 30 for controlling an increase of brake fluid pressure of the wheel cylinder 4 is installed to one of the branched conduits and a pressure increasing control valve 31 for controlling an increase of brake fluid pressure of the wheel cylinder 5 is installed to the other thereof.

The pressure increasing control valves 30 and 31 are two-position valves capable of controlling communicating and shut-off states by an electronic control unit (hereinafter, referred to as ECU). When the two-position valves are controlled to a communicating state, the master cylinder pressure or the brake fluid pressure produced by a pump 10 can be applied to the respective wheel cylinders 4 and 5.

In the normal braking operation where ABS is not controlled by the ECU as in the case where pressure reduction of the wheel cylinder pressure is not carried out, the pressure increasing control valves 30 and 31 are always controlled in the communicating state. Safety valves 30a and 31a are installed in parallel with the pressure increasing control valves 30 and 31, respectively. The safety valves 30a and 31a allows the brake fluid to swiftly return from the wheel cylinders 4 and 5 to the master cylinder 3 when ABS control has been finished by stopping depression of the brake pedal 1.

Pressure reducing control valves 32 and 33 capable of controlling communicating and shut-off states by the ECU are respectively arranged at conduits B connecting the second conduits A2 between the pressure increasing control valves 30 and 31 and the wheel cylinders 4 and 5, and a reservoir port 20a of a reservoir 20. In the normal braking operation, the pressure reducing control valves 32 and 33 are always brought into a cut-off state.

A rotary pump 10 is arranged at a conduit C connecting the reservoir hole 20a of the reservoir 20 and the second conduit A2 between the proportioning valve 22 and the pressure increasing control valves 30 and 31. Safety valves 10a and 10b are disposed in the conduit C on both sides of the rotary pump 10. The safety valves 10a and 10b may be built in the rotary pump 10. A motor 11 is connected to the rotary pump 10 to drive the rotary pump 10. A detailed explanation of the rotary pump 10 will be given later.

A damper 12 is arranged on the discharge side of the rotary pump 10 in the conduit C to alleviate pulsation of the brake fluid delivered by the rotary pump 10. An auxiliary conduit D is installed to connect the conduit C between the reservoir 20 and the rotary pump 10, and the master cylinder 3. The rotary pump 10 sucks the brake fluid of the first conduit A1 via the auxiliary conduit D and discharges it to the second conduit A2, whereby the brake fluid pressures of the wheel cylinders 4 and 5 are made higher than the master cylinder pressure. As a result, wheel braking forces of the wheel cylinders 4 and 5 are increased. The proportioning valve 22 works to hold the pressure difference between the master cylinder pressure and the wheel cylinder pressure.

A control valve 34 is installed in the auxiliary conduit D. The control valve 34 is always brought into a cut-off state in the normal braking operation.

A check valve 21 is arranged between a connection point of the conduit C and the auxiliary conduit D and the reservoir 20 to prevent the brake fluid drawn via the auxiliary conduit D from flowing in a reverse direction to the reservoir 20.

A control valve 40 is disposed between the proportioning valve 22 and the pressure increasing control valves 30 and 31 in the second conduit A2. The control valve 40 is normally controlled in a communicating state. However, the control valve 40 is switched to a differential pressure producing state to hold the pressure difference between the master cylinder pressure and the wheel cylinder pressure, in a case that the vehicle is rapidly braked, when the master cylinder pressure is too low to obtain the necessary wheel cylinder pressure by some reasons, for example, in a case where the boosting function of the booster 2 is lowered or lost and, at this time, the pump10 is operated. Also, the control valve 40 is switched to the differential pressure producing state when traction control (TRC) is carried out. Though the control valve 40 and the proportioning valve 22 are employed in this embodiment, it is possible to have only a pressure difference control valve for holding the pressure difference between the master cylinder and the wheel cylinder.

The structure of the pump equipment 100 will be described with reference to FIG. 2. As mentioned above, the brake apparatus is provided with the hydraulic circuit having first and second conduit lines. The pump equipment 100 is constituted by a casing 50, a drive shaft 54 to be driven by the motor 11 shown in FIG. 1, the first rotary pump 10 for the first conduit line and a second rotary pump 13 for the second conduit line.

Figure 2:
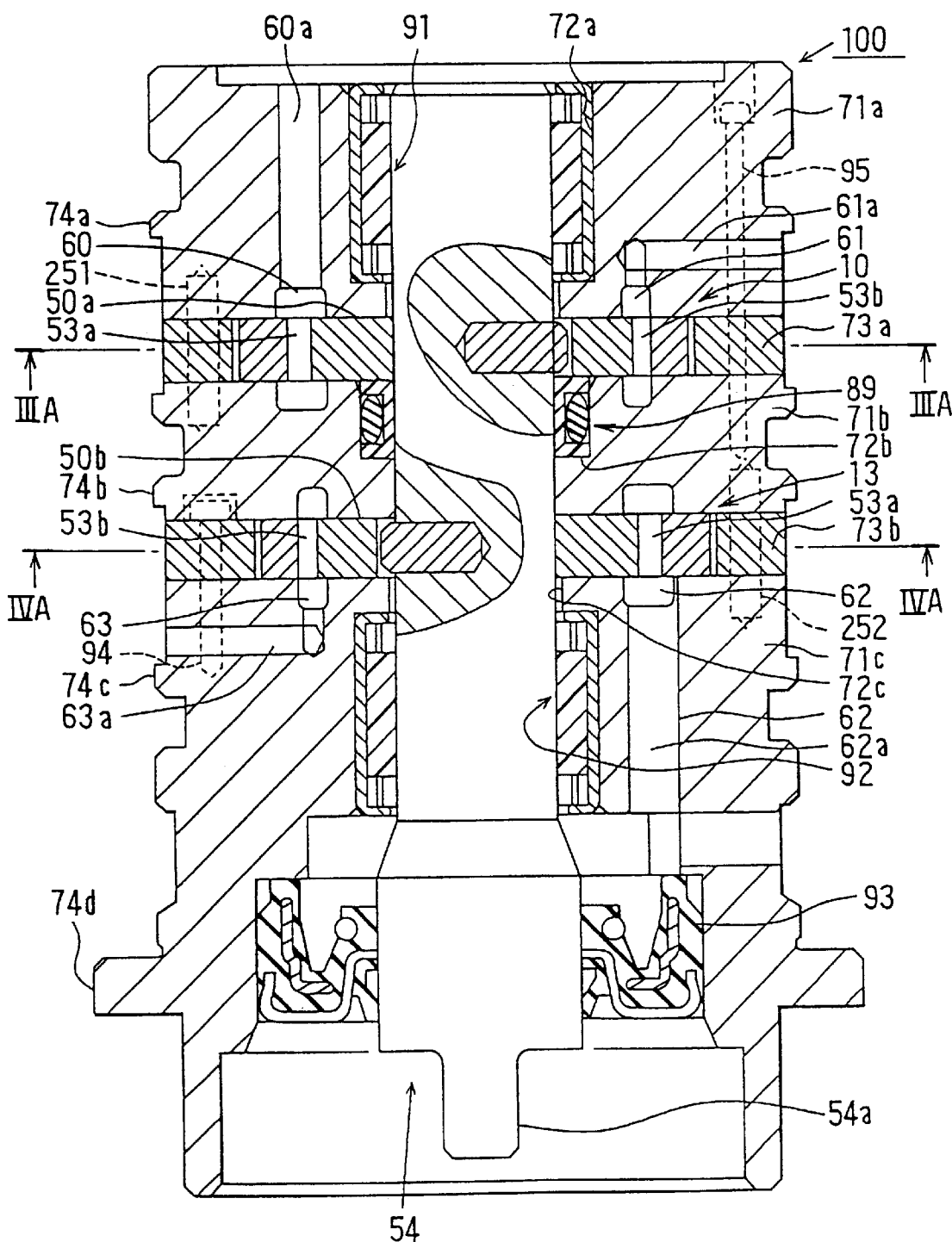
FIG. 2 is a schematic sectional view of a pump equipment.

As described in FIG. 2, the casing 50 is constituted by first, second and third cylinders 71a, 71b and 71c and first and second cylindrical center plates 73a and 73b. After piling up in order the first cylinder 71a, the first cylindrical center plate 73a, the second cylinder 71b, the second cylindrical center plate 73b and the third cylinder 71c, the casing 50 of the pump equipment 100 is assembled by welding all of peripheral borders of the piled up cylinders 71a, 71b and 71c and cylindrical center plates 73a and 73b. A pump room 50a of the first rotary pump 10 is constructed by putting the first cylindrical center plate 73a between the first and second cylinders 71a and 71b. On the other hand, a pump room 50b of the second rotary pump 13 is constructed by putting the second cylindrical center plate 73b between the second and third cylinders 71b and 71c.

The first, second and third cylinders are respectively provided with first, second and third center bores 72a, 72b and 72c. A roll type first bearing 91 is disposed at the internal periphery of the first center bore 72a and a roll type second bearing 92 at the internal periphery of the third center bore 72c. The drive shaft 54 inserted through the first, second and third center bores 72a, 72b and 72c is held between the first and second bearings 91 and 92. Consequently, the two rotary pumps 10 and 13 may be put between the bearings 91 and 92.

The third cylinder 71c has a hollow at the opposite side from the surface where the second cylindrical center plate is welded. The drive shaft 54 has a key 54a which is formed by being partly projected from its end portion and protruded into the hollow of the third cylinder 71c. The key 54a is used to couple the drive shaft 54 with a motor shaft of the motor 11. An oil seal 93 is disposed in the hollow of the third cylinder 71c in such a way that the outside surface of the drive shaft may be wrapped up.

The outside surfaces of the first, second and third cylinders 71a, 71b and 71c are provided respectively with flange portions 74a, 74b and 74c, each of which is protruded further from the portions where the first, second and third cylinders 71a, 71b and 71c and the first and second cylindrical center plates 73a and 73b are welded. The flange portions 74a, 74b and 74c are so constructed that the respective outer diameter of the welded portions, even if expanded by welding, may not go beyond the respective outer diameter of the flange portions 74a, 74b and 74c. As the expanded outer diameter of the welded portions never exceeds the outer diameter of o rings(not shown)installed on the outer surface of the casing 50 as the flange portions 74a, 74b and 74c are formed, the pump 100 may be effectively assembled to the brake apparatus. Further, the outer surface of the third cylinder is provided with a flange 74d, the outer diameter of which is larger than that of the flange portion 74c. The flange 74d is used as a position setting reference for assembling and welding the casing 50 of the pump equipment 100, as described later. Screws 94 and 95 are for the temporal fitting before the welding, as explained in detail later.

Figure 3A:
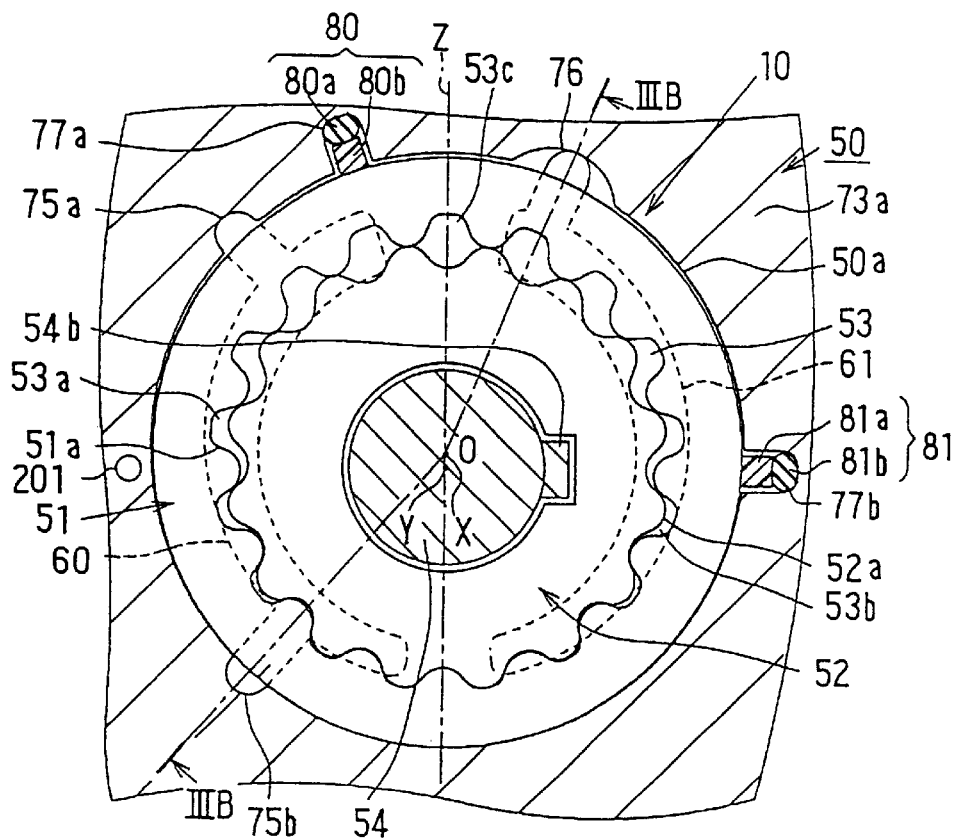
FIG. 3A is a sectional view taken along a line IIIA—IIIA of FIG. 2.
Figure 3B:
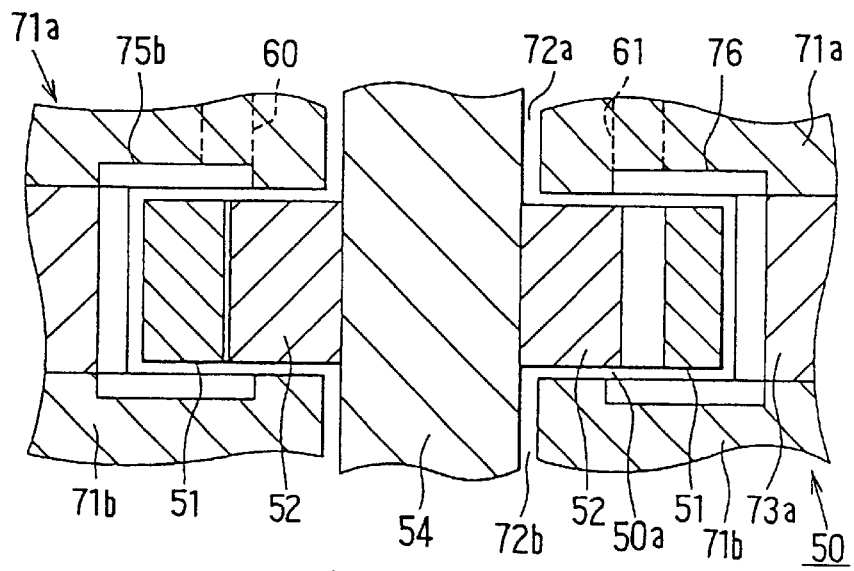
FIG. 3B is a sectional view taken along a line IVA—IVA of FIG. 3A.
Figure 4A:
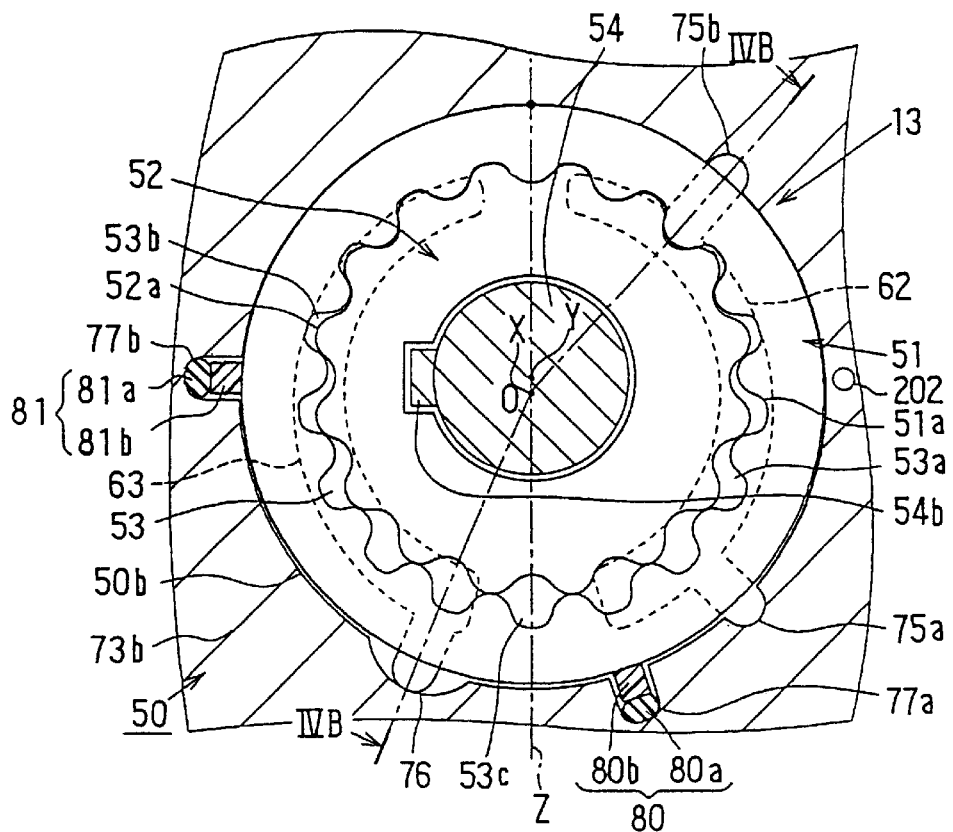
FIG. 4A is a sectional view taken along a line IIIB—IIIB of FIG. 2.
Figure 4B:
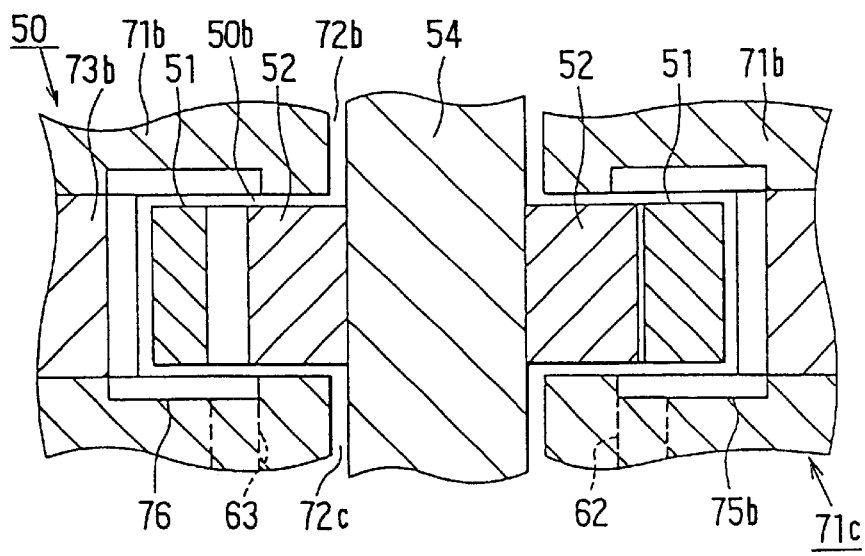
FIG. 4B is a sectional view taken along a line of FIG. 4A.

FIG. 3A is a sectional view taken along a line IIIA—IIIA of FIG. 2 and FIG. 3B is a sectional view taken along a line IIIA—IIIA of FIG. 3A. FIG. 4A is a sectional view taken along a line IVA—IVA of FIG. 2 and FIG. 4B is a sectional view taken along a line IVB—IVB of FIG. 4A. First, the structure of the rotary pump 10 will be described with reference to FIGS. 3A and 3B.

An outer rotor 51 and an inner rotor 52 are contained in the pump room 50a of the casing 50 of the rotary pump 10. The outer rotor 51 and the inner rotor 52 are assembled in the casing 50 in a state where respective central axes (point X and point Y in the drawing) are shifted from each other. The outer rotor 51 is provided with an inner teeth portion 51a at its inner periphery. The inner rotor 52 is provided with an outer teeth portion 52a at its outer periphery. The inner teeth portion 51a of the outer rotor 51 and the outer teeth portion 52a of the inner rotor 52 form a plurality of gap portions 53 and are in mesh with each other. As is apparent from FIG. 3A, the rotary pump 10 is a pump of a multiple teeth trochoid type having no partition plate (crescent) in which the gap portions 53 are formed by the inner teeth portion 51a of the outer rotor 51 and the outer teeth portion 52a of the inner rotor 52. The inner rotor 52 and the outer rotor 51 share a plurality of contact points (that is, contact faces) at the mesh faces in order to transmit rotation torque of the inner rotor 52 to the outer rotor 51.

The drive shaft 54 for driving the inner rotor 52 is provided with a key 54b, whereby drive force is transmitted from the drive shaft 54 to the inner rotor 52 via the key 54a. The outer rotor 51 and the inner rotor 52 are rotatably arranged in the center bore of the cylindrical center plate 73a. That is, a rotating unit constituted by the outer rotor 51 and the inner rotor 52 is rotatably incorporated in the pump room 50a of the casing 50. The outer rotor 51 rotates with point X as a rotation axis and the inner rotor 52 rotates with point Y as a rotation axis.

A hole 201 is provided for inserting a pin 251 described in the FIG. 2 for the position setting at the welding operation as explained later. In the first and second cylinders 71a and 71b, recesses are also provided at the position corresponding to the hole 201 for inserting the pin 251, respectively.

When a line running on both point X and point Y respectively corresponding to the rotation axes of the outer rotor 51 and the inner rotor 52 is defined as a center line Z of the rotary pump 10, an intake port 60 and a discharge port 61 both of which communicate with the pump room 50a are formed on the left and right sides of the center line Z in the first cylinder 71a. There are also provided with an intake conduit 60a extending from the intake port 60 to the intake conduit 19 and a discharge conduit 61a extending from the discharge port 61 to the discharge conduit 21, as described in FIGS. 2 and 3. The intake port 60 and the discharge port 61 are arranged at positions communicating with a plurality of gap portions 53 constituted by intake chambers 53a and discharge chambers 53b. The brake fluid from outside can be sucked into the intake chambers 53a via the intake port 60 and the brake fluid in the discharge chambers 53b can be discharged to outside via the discharge port 61.

The first cylinder 71a is provided with communicating paths 75a and 75b for communicating the outer periphery of the outer rotor 51 with the intake port 60 and a communicating path 76 for communicating the outer periphery of the outer rotor 51 with the discharge port 61. The communicating paths 75a and 75b are arranged at positions advanced respectively in left and right directions from the center line Z to the intake port 60 by an angle of about 45 centering on point X constituting the rotation axis of the outer rotor 51. The communicating path 76 is formed to communicate the gap portion 53 most adjacent to the first closed gap portion 53c in the plurality of gap portions 53 communicating with the discharge chamber 53b with the outer periphery of the outer rotor 51. Specifically, the communicating path 76 is arranged at a position advanced in right direction from the center line Z to the discharge port 61 by an angle of about 22.5 centering on point X.

Recessed portions 77a and 77b are formed on a wall face of the first cylindrical center plate 73a forming the pump room 50a at a position advanced in the left direction from the center line Z to the intake chamber 53a by an angle of about 22.5 degrees and at a position advanced in right direction from the center line Z to the discharge chamber 53b by an angle of about 90 degrees centering on point X constituting the rotation axis of the outer rotor 51. Seal members 80 and 81 are respectively installed in the recessed portions 77a and 77b to restrain the brake fluid from flowing in the outer periphery of the outer rotor 51. Specifically, the seal members 80 and 81 are arranged respectively at an intermediate point between the communicating paths 75a and 76 and the communicating paths 76 and 75b. The seal members 80 and 81 serve to separate, in the clearance between the outer rotor 51 and the cylindrical center plate 73a, a portion in which pressure of the brake fluid is low from a portion in which pressure of the brake fluid is high. Further, a sealing member 89 is shown in FIG. 2 disposed in the clearance between an inner surface of the second cylinder 71b and the outer surface of the drive shaft 54 for restricting fluid communication between the two rotary pumps 10 and 13.

The seal members 80 and 81 are constituted by rubber members 80a and 81a substantially in a shape of a circular cylinder and resin members 80b and 81b made of Teflon in a shape of a cube. The resin members 80b and 81b are biased by the rubber members 80a and 81a to be brought into contact with the outer rotor 51. That is, more or less error amount is caused in the size of the outer rotor 51 by fabrication error or the like. Accordingly, the error amount can be absorbed by the rubber members 80a and 81a having elastic force.

The rotary pump 10 has the construction as described above and, hereafter, the rotary pump 13 will be explained according to FIGS. 4A and 4B. As the construction of the rotary pump 13 is nearly same as that of the rotary pump 10, only the different portions thereof will be described and the explanation of the portions having the same reference number as that of the rotary pump 10 will be omitted.

The outer and inner rotors of the rotary pump 13 is contained in a pump room 50b constituted by the second cylindrical center plate 73b and the second and third cylinders 71b and 71c. Respective parts and components of the rotary pump 13 are arranged at the positions where the respective parts and components of rotary pump 10 shown in the FIGS. 3A and 3B are rotated by an angle of 180 degrees with respect to the center axis of the drive shaft 54. The third cylinder 71c is provided with intake and discharge conduits 62a and 63a extending respectively from intake and discharge ports 62 and 63 to the second conduit line of the brake apparatus. The positions of the intake and discharge conduits 60a and 61a in the first cylinder 71a and the positions of the intake and discharge conduits 62a and 63a in the third cylinder 71c are opposite each other, in another word, nearly symmetrical, with respect to the center axis of the drive shaft 54, as illustrated in FIG. 2.

A hole 202 shown in FIG. 4A is for inserting a pin 252 described in FIG. 2 for the position setting at the welding operation as explained later. In the second and third cylinders 71b and 71c, recesses are also provided at the position corresponding to the hole 202 for inserting the pin 252, respectively.

The rotary pumps 10 and 13 constituting the pump equipment 100 are constructed as described above.

Next, an explanation will be given of operation of the brake apparatus and the pump equipment 100 with reference to the rotary pump 10. The control valve 34 provided in the brake apparatus is pertinently brought into a communicating state when high pressure brake fluid needs to be supplied to the wheel cylinders 4 and 5, for example, when braking force in correspondence with depressing force of the brake pedal 1 cannot be obtained because of failure of the booster 2, or when an amount of operating the braking pedal 1 is large. When the control valve 34 is switched in the communication state, the master cylinder pressure generated by depressing the brake pedal 1 is applied to the rotary pump 10 via the auxiliary conduit D.

In the rotary pump 10, the inner rotor 52 is rotated in accordance with rotation of the drive shaft 54 by driving the motor 11. In response to rotation of the inner rotor 52, the outer rotor 51 is also rotated in the same direction by the mesh between the inner teeth portion 51a and the outer teeth portion 52a. At this time, the volume of each of the gap portions 53 is changed from large to small or vice versa during a time period in which the outer rotor 51 and the inner rotor 52 make one turn. Therefore, the brake fluid is sucked from the intake port 60 to the intake chambers 53a and is discharged from the discharge port 61 through the discharge chambers 53b to the second conduit A2. Pressures of the wheel cylinders can be increased using the discharged brake fluid.

In this way, the rotary pump 10 can carry out a basic pumping operation in which the brake fluid is sucked from the intake port 60 and is discharged from the discharge port 61 by rotation of the rotors 51 and 52.

According to the embodiment mentioned above, the communicating paths 75a, 75b and 76 serve to operate in such a way that the respective fluid pressure of the outer periphery of the outer rotor 51 at the intake and discharge sides are kept same separately as the respective low and high fluid pressure of the intake and discharge ports 60 and 61. By the pressure relationship as described above, the outer rotor 51 is brought into a substantially balanced state in pressure in respect of the lateral direction of the drawing. Therefor, the rotary pump 10 may be driven stably and with good balance.

As the pressure difference exists between the low pressure portion communicating to the intake port 60 and the high pressure portion communicating to the discharge port 61 at the outer periphery of the outer rotor 51, the brake fluid may leak from the high pressure portion to the low pressure portion via the clearance between the outer periphery of the outer rotor 51. However, the brake-fluid leakage is prevented by the seal members 80 and 81 formed between the communicating paths 75a and 76 and the communicating paths 76 and 75b On the other hand, the rotary pump 13 is operated to suck brake fluid from the intake port 62 and discharge them from the discharge port 63, which is the same pump operation as the rotary pump 10. At this moment, as each of discharge brake fluid pressure at the sides of the discharge ports 61 and 63 becomes higher than each of intake brake fluid pressure at the sides of the intake ports 60 and 62, each of the reaction forces produced thereby is given against the drive shaft 54. However, the respective reaction forces are canceled out and counterbalanced each other because the rotary pumps 10 and 13 are respectively arranged at the locations different by an angle of 180 degrees and the intake ports 60 and 62 and the discharge ports 61 and 63 thereof are located at the points which are nearly symmetrical with respect to the center axis of the drive shaft 54. Therefor, the possible bending of the drive shaft 54 can be limited to assure the smooth operation of the pumps.

The intake fluid conduits 60*a* and 62*a* and the discharge fluid conduits 61*a* and 63*a* are respectively arranged at the locations which are, not between the rotary pumps 10 and 13, but outside therefrom. As a result, the locations of the pumps may come closer and the distance between the first and second bearings 91 and 92 can be shorter so that the pump equipment may become compact and the possible bending of the drive shaft 54 may be more limited.

It is possible, as an alternative embodiment of the present invention, to arrange the intake fluid conduits 60*a* and 62*a* and the discharge fluid conduits 61*a* and 63*a* at the locations between the rotary pumps 10 and 13. In this case, if the intake ports 60 and 62 and the discharge ports 61 and 63 thereof are located at the points which are nearly symmetrical with respect to the center axis of the drive shaft 54, the possible bending of the drive shaft 54 can be limited to assure the smooth operation of the pumps.

Further, it goes without saying that, even in a case of employing more than two rotary pumps, the same effect mentioned above may be expected, if the respective rotary pumps are so arranged as to cancel out and counterbalance each other the respective reaction forces against the drive shaft 54 produced by the discharge high pressure of the respective rotary pumps.

Figure 5:
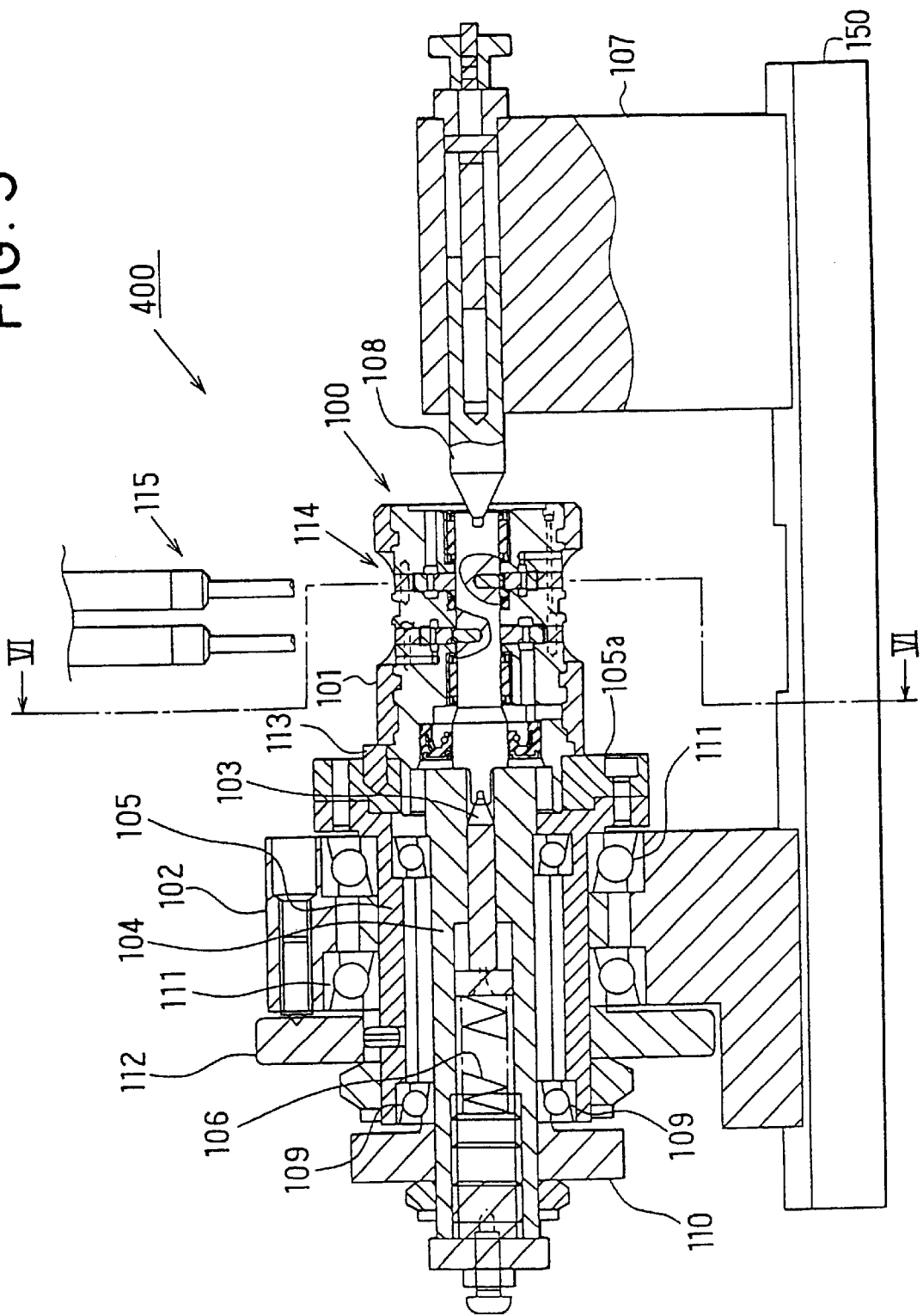
FIG. 5 is a sectional view of a welding equipment.
Figure 6:
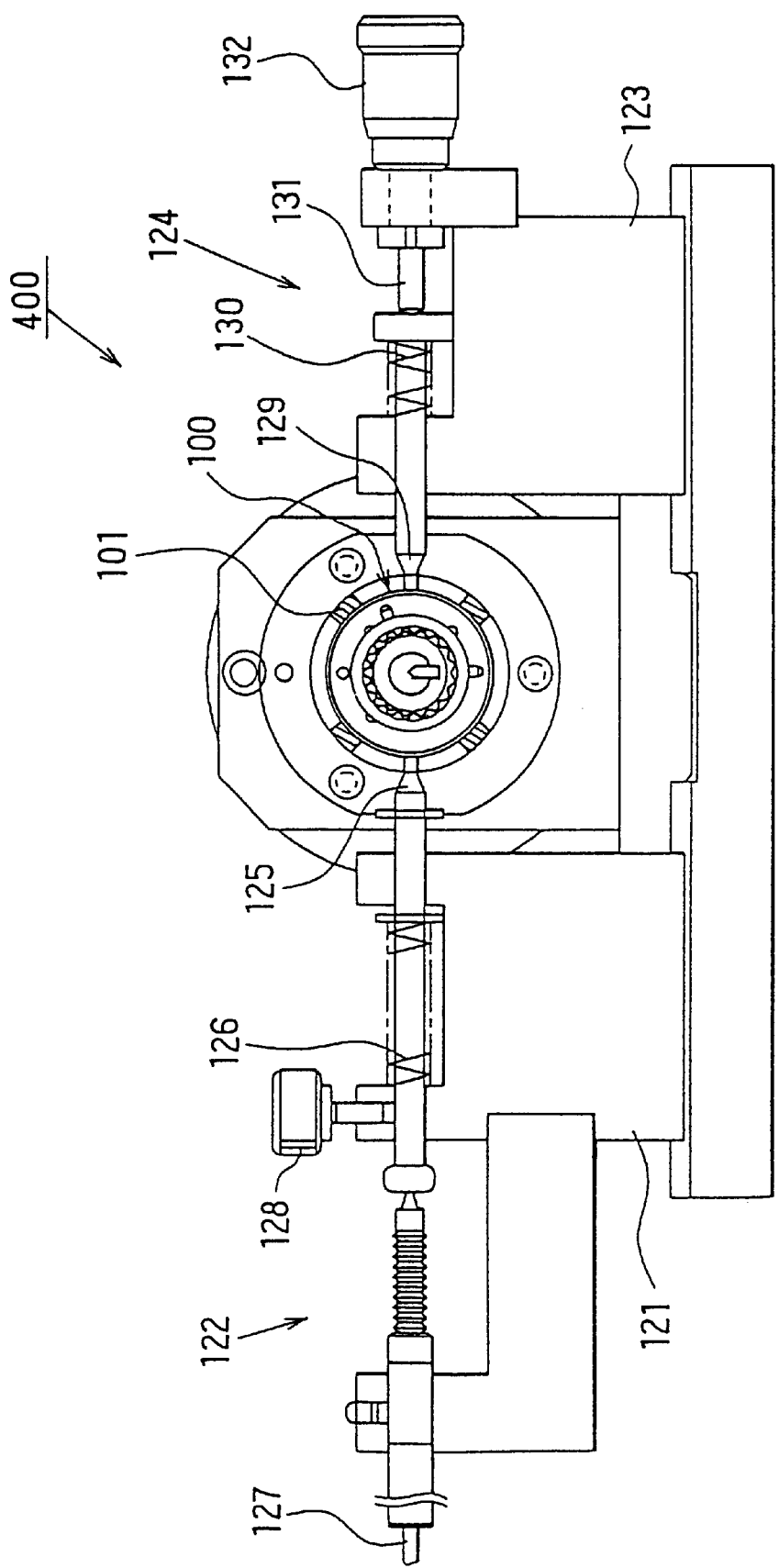
FIG. 6 is an outlook viewed from a line of VI—VI of FIG. 5.

A method for welding the outside surface of the casing 50 of the pump equipment 100 will be described hereinafter. FIG. 5 shows a sectional view of a welding equipment provided with the pump equipment 100. FIG. 6 is an outlook viewed from a line of VI—VI of FIG. 5.

The welding equipment 400 is provided with a holder 101 for holding the pump equipment 100. The holder 101 is fixed on a basement 150 through a housing 102. The housing is provided with a circular opening portion within which a shaft 105, a cylindrical shaft 104 inserted into the shaft 105 and a pole shaped center pin 103 inserted into the cylindrical shaft 104 are arranged, respectively. The outer diameter of the shaft 105 is nearly same as that of the holder 101. The holder 101 is fixed on the shaft 105. An end surface 105*a* of the shaft 105 on which the holder 101 is installed is a reference surface for the position setting of the pump equipment 100. By contacting the flange 74*d* of the pump equipment 100 to the end surface 105*a* of the shaft 105, the axial direction position setting of the pump equipment 100 can be made.

The drive shaft 54 is held for the position setting between a center pin 108 fixed through a stay 107 on the basement 150 and the center pin 103 biased by a spring 106 toward the center pin 108. The ball bearing 109 is installed between the inner surface of the shaft 105 and the outer surface of the shaft 104 so that the shaft 104 may be rotated within the shaft 105. The shaft 104 is provided with a knob 110 for rotating the shaft 104 at its end portion opposite to the side of the holder 101. The bore provided in the shaft 104 has a rectangular cross section to be able to insert the key 54*a* of the drive shaft 54. When the pump equipment 100 is held in the holder 101, the key 54*a* is fitted into the bore of the shaft 104 and, if the knob 110 is rotated, the drive shaft 54 is rotated with the shaft 104. Therefor, the rotation sway of the drive shaft 54 can be accurately adjusted.

The ball bearing 111 is installed between the inner surface of the housing 102 and the outer surface of the shaft 105 so that the shaft 105 may be rotated within the housing 102. The shaft 105 is provided with a knob 112 for rotating the shaft 105 and the holder 101 at its end portion opposite to the side of the holder 101. A pin 113 for a circumference position setting is provided on the shaft 105. The circumference rotation of the pump equipment 100 may be restricted by the pin 113 and a recess (not shown) to be engaged with the pin 113.

The holder 101 has window portions 114 partly opened in its outer circumference, through which welding portions of the pump equipment 100 can be observed. A laser beam emitting device for welding is arranged at the position confronting the window portions 114 and the welding on the pump equipment 100 may be operated through the window portions 114.

The position setting of the pump equipment 100 in an axial direction of the drive shaft 54 can be made by the holder 101, the center pins 103 and 108 and the end surface 105*a*, as described in FIG. 23.

For making the position setting of the pump 100 in a circumference direction, a position detecting sensor device 122 fixed through a stay 121 on the basement 150 is arranged at a position confronting one side of the circumference of the holder 101 and an adjusting pin device 124 fixed through a stay 123 on the basement 150 at a position confronting the other side of the circumference of the holder 101, as described in FIG. 24.

The position detecting sensor device 122 is provided with a measuring probe 125 for contacting the pump equipment 100 set in the holder 101, a spring 126 for pressing forward the measuring probe 125 and a sensor portion 128 for generating a digital signal showing the position of the measuring probe 125 through a code 127 to an amplifier. The measuring probe 125 is fitted into a bore provided in the stay 121 and can be moved to contact the pump equipment 100 by the biasing force of the spring 126.

The adjusting pin device 124 is provided with a measuring probe 129 for pushing the pump equipment 100, a spring for preventing the measuring probe 129 from being shaken and an adjusting knob 132 for adjusting the position of the measuring probe 129 by moving a contact element 131. The measuring probe 129 is fitted into a bore provided in a stay 123 to be able to be moved therein and its position is adjustable by the adjusting knob 132.

Next, the method for assembling the pump equipment 100 will be explained by using the welding equipment 400 mentioned above. After containing the outer and inner rotors 51 and 52 into the first and second cylindrical center plates 73*a* and 73*b*, respectively, the third cylinder 71*c*, the second cylindrical center plate 73*b*, the second cylinder 71*b*, the first cylindrical center plate 73*a* and the first cylinder 71*a* are sequentially piled up into the drive shaft 54. At this time, the pins 251 and 252 are arranged in the hole 201 of the first cylindrical center plate 73*a* and in the hole 202 of the second cylindrical center plate 73*b*, respectively. The pins 251 and 252 are inserted into the corresponding recesses of the first, second and third cylinders 71*a*, 71*b* and 71*c*, respectively.

The first cylindrical center plate 73*a* is held between the first and second cylinders 71*a* and 71*b* so as to be pivotally rotated with respect to the pin 251 and the second cylindrical center plate 73*b* between the second and third cylinders 71*b* and 71*c* so as to be pivotally rotated with respect to the pin 252. By pivoting the first and second cylindrical center plates 73*a* and 73*b* centering around the pins 251 and 252, respectively, the position setting of the first and second cylindrical center plates 73*a* and 73*b* can be made with respect to the first, second and third cylinders 71*a*, 71*b* and 71*c*.

As a next step after having been piled up as mentioned above, the first, second and third cylinders 71a, 71b and 71c and the first and second cylindrical center plates 73a and 73b are contained in the holder 101 in a state that the third cylinder contacts the end surface 105 for setting the position of the pump equipment 100 in the axial direction. The pins 251 and 252 are positioned up and down with respect to the drive shaft 54, respectively.

For setting the position of the pump equipment 100 in the circumference direction, the measuring probe 129 is moved by the adjusting knob 132 until the first, second and third cylinders 71a, 71b and 71c or the first and second cylindrical center plates 73a and 73b are moved to the most right position. As clearances exist firstly between the outer and inner rotors 51 and 52, secondly between the inner rotor 52 and the drive shaft 54 and between the outer rotor 51 and thirdly the first or second cylindrical center plate 73a or 73b, the first, second and third cylinders 71a, 71b and 71c or the first and second cylindrical center plates 73a and 73b are moved to the right so as to bring all of the respective clearances together to the left side or the right side.

Then, the measuring probe 129 is moved by the adjusting knob 132 until the first and second cylindrical center plates 73a and 73b or the first, second and third cylinders 71a, 71b and 71c are moved to the most left position by a distance corresponding to an accumulated value of the respective clearances. Therefor, the measuring probe 125 at the opposite side is moved from the most right position to the most left position or vice versa so that the accumulated value of the clearances among the first or second cylindrical center plate 73a or 73b, the outer rotor 51, the inner rotor 52 and the drive shaft 54 may be detected by the sensor portion 128, which generates the digital signal responsive to the value of the accumulated clearances.

Based on the value of the detected clearances, the first, second and third cylinders 71a, 71b and 71c or the first and second cylindrical center plate 73a and 7b are moved back not to bring one sided clearances but to secure adequate and accurate clearances by the adjusting knob 132 and, then, held by both of the measuring probes 125 and 129. The circumference position setting of the first, second and third cylinders 71a, 71b and 71c or the first and second cylindrical center plate 73a and 73b is made as mentioned above, that is, the circumference position setting of the pump equipment 100 can be made only by pivoting the first and second cylindrical center plate 73a and 73b centering around the pins 251 and 252. More roughly speaking, by pivoting the first cylindrical center plate 73a at least on the first cylinder 71a and also by pivoting the second cylindrical center plate 73b at least on the third cylinder 71c, the circumference position setting can be made.

After finishing the axial and circumference position setting of the pump equipment 100, the first, second and third cylinders 71a, 71b and 71c or the first and second cylindrical center plate 73a and 73b are temporally fixed by a spot welding in use of the laser beam for welding from the laser emitting device 115. It is preferable not to use so strong laser beam, when the tentative spot welding is made from one side position, for limiting a deformation of the first, second and third cylinders 71a, 71b and 71c or the first and second cylindrical center plate 73a and 73b.

On the other hand, when the laser beams are emitted from plural side positions at the same time so as to counterbalance each other the respective forces given by the laser beams, the stronger laser beams may be used for the spot welding so that the stronger tentative fixing may be realized, compared with the laser beam for the spot welding from the one side position.

After finishing the tentative welding on the pump equipment 100, the pump equipment 100 is removed from the welding equipment 400 and, then, all around peripheral borders constituted by the first cylinder 71a, the first cylindrical center plate 73a, the second cylinder 71b, the second cylindrical center plate 73b and the third cylinder 71c are welded by the other welding equipment in order to complete the pump equipment 100 having two rotary pumps 10 and 13.

On the other hand, if the laser beams from plural side positions at the same time so as to counterbalance each other the respective forces given by the laser beams are applied to the welding portions, the tentative spot welding may be eliminated. By rotating the pump equipment 100 in use of the knob 112 for rotating the holder 101 after finishing the axial and circumference position setting of the pump equipment 100, all around the peripheral borders thereof can be welded without causing the deformation or the position shift.

As an alternative method for assembling the pump equipment 100, it is possible to apply a divided assembling or sub assembling method. That is, after inserting the drive shaft 54 into the third cylinder 71c and the second cylindrical center plate 73b in which the outer and inner rotors 51 and 52 are contained, the third cylinder 71c and the second cylindrical center plate 73b are held in the holder 101 and, then, temporally fixed by a screw 94 as described in the FIG. 2 after finishing the circumference position setting in a similar way as mentioned above.

Next, the second cylinder 71b, the first cylindrical center plate 73a and the first cylinder 71a are inserted in order into the drive shaft 54 to be held by the holder 101 and, then, temporally fixed by a screw 95 after finishing the circumference position setting in a similar way as mentioned above. After completing the temporal fixing, the outer surfaces of the pump equipment 100 are finally welded.

As the diameter of screws 94 and 95 is slender and their strength is not sufficient to finally assemble the pump equipment 100 so that the space necessary for the temporal fixing may be limited, there is no fear that the pump equipment 100 becomes large. It is possible to eliminate the screws 94 and 95, if final welding is made from the beginning without the temporal fixing.

What is claimed is:

1. A pump equipment comprising:
    a first rotary pump comprised of first rotors, a first cylindrical center plate, first and second cylinders and a first pump room constructed by putting the first cylindrical center plate between the first and second cylinders for containing the first rotors therein;
    a second rotary pump comprised of second rotors, a second cylindrical center plate, the second cylinder, a third cylinder and a second pump room constructed by putting the second cylindrical center plate between the second and third cylinders for containing the second rotors therein;
    a drive shaft extending to penetrate through the first cylinder, the first rotors, the second cylinder, the second rotors and the third cylinder for driving the first and second rotary pumps;
    a sealing member disposed in a clearance between an inner surface of the second cylinder and an outer surface of the drive shaft for restricting fluid communication between the first and second rotary pumps through the clearance; and
    first and second intake conduits each having an intake port for the first and second rotary pumps and first and second discharge conduits each having a discharge port for the first and second rotary pumps, respectively, the first and second discharge conduits being arranged on radially opposite sides of an axis of the drive shaft;

wherein the first cylinder, the first cylindrical center plate, the second cylinder, the second cylindrical center plate and the third cylinder are arranged in series along the axis of the drive shaft and fixed to each other.

2. A pump equipment according to claim 1, wherein the first and second discharge conduits are respectively constructed to extend from the first and second discharge ports, wherein the respective extending direction of the first and second discharge conduit are opposite each other with respect to the drive shaft.

3. A pump equipment according to claim 1, further comprising:

bearings for holding the drive shaft are respectively installed in the first and third cylinders.

4. A pump equipment according to claim 1, further comprising:

a first pin pierced through the first cylindrical center plate and held in recesses provided respectively in the first and second cylinders; and a second pin pierced through the second cylindrical center plate and held in recesses provided respectively in the second and third cylinders.

5. A pump equipment according to claim 1, wherein the first intake and discharge ports are provided in the first cylinder and the second intake and discharge ports are provided in the third cylinder, respectively.

6. A pump equipment according to claim 1, wherein axially adjacent any of the first cylinder, the first cylindrical center plate, the second cylinder, the second cylindrical center plate and the third cylinder are fixed by screws to each other.

7. A pump equipment according to claim 1, wherein axially adjacent any peripheral borders of the first cylinder, the first cylindrical center plate, the second cylinder, the second cylindrical center plate and the third cylinder are fixed by welding to each other.

8. A pump equipment comprising:

a drive shaft;

plural rotary pumps to be driven by the drive shaft;

an intake port provided in each of the plural rotary pumps for sucking fluid; and a discharge port provided in each of the plural rotary pumps for discharging the fluid in high pressure;

wherein the respective discharge ports are located at the places where the respective reaction forces against the drive shaft to be produced by the high pressure fluid are cancelled out and counterbalance each other, wherein the plural rotary pumps are a first rotary pump and a second rotary pump that are arranged in series along the drive shaft, wherein the respective discharge ports of the first and second rotary pumps are located at the points opposite each other with respect to the center axis of the drive shaft, wherein the first rotary pump is comprised of first rotors to be rotated by the drive shaft, a first cylindrical center plate, first and second cylinders and a first pump room constructed by putting the first cylindrical center plate between the first and second cylinders for containing the first rotors therein;

wherein the second rotary pump is comprised of second rotors to be rotated by the drive shaft, a second cylindrical center plate, the second cylinder, a third cylinder and a second pump room constructed by putting the second cylindrical center plate between the second and third cylinders for containing the second rotors therein;

wherein a first intake conduit communicating to the intake port for the first rotary pump and a first discharge conduit communicating to the discharge port for the first rotary pump are respectively provided in the first cylinder;

wherein a second intake conduit communicating to the intake port for the second rotary pump and a second discharge conduit communicating to the discharge port for the second rotary pump are respectively provided in the third cylinder;

wherein the first cylinder, the first cylindrical center plate, the second cylinder, the second cylindrical center plate and the third cylinder are piled up and integrated; and wherein the first cylinder, the first cylindrical center plate and the second cylinder are fixed by a screw and all around the peripheral borders of the first cylinder, the first cylindrical center plate and the second cylinder are welded; and the second cylindrical center plate and the third cylinder are fixed by a screw and all around the peripheral border of the second cylindrical center plate and the third cylinder is welded.

* * * * *